Jan. 12, 1943.                    M. COOPER                    2,308,267
                        COMBINATION RECEPTACLE AND TRAY
                              Filed July 3, 1940
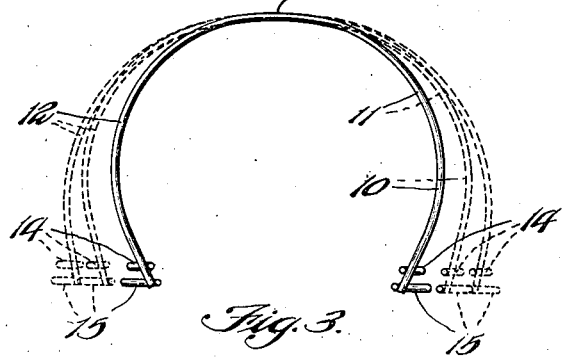
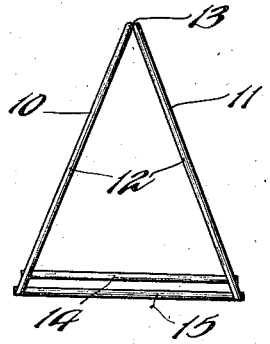
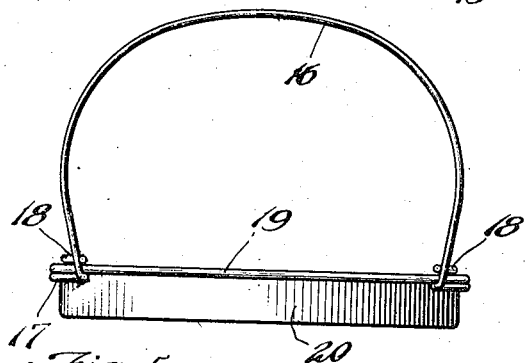
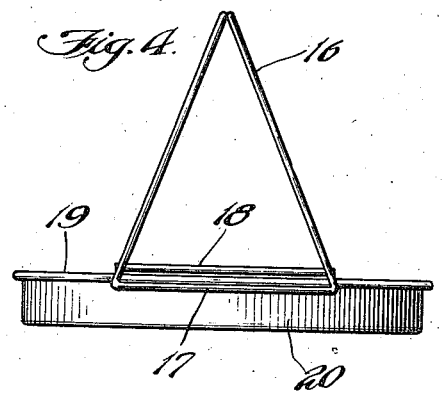
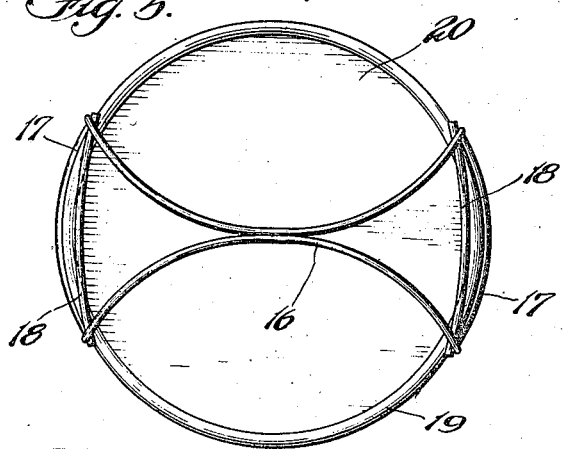
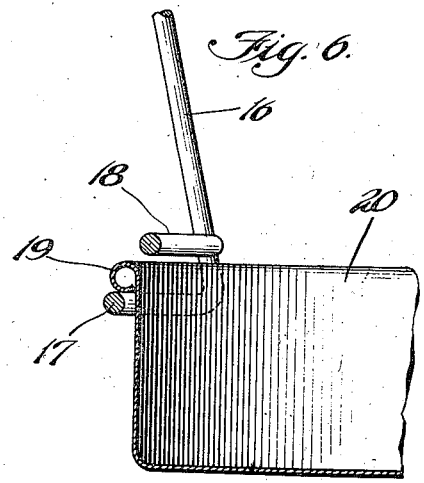
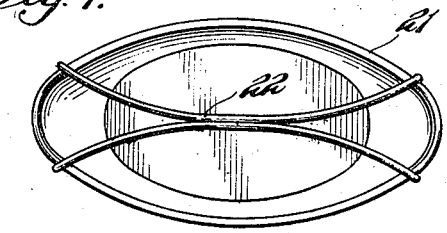
INVENTOR.
Morris Cooper
BY Glenn S. Noble
ATTORNEY.

Patented Jan. 12, 1943

2,308,267

UNITED STATES PATENT OFFICE 2,308,267

COMBINATION RECEPTACLE AND TRAY

Morris Cooper, Chicago, Ill.

Application July 3, 1940, Serial No. 343,783

1 Claim. (Cl. 294—33)

This invention relates to receptacles in the nature of baskets which may be used for the sale of fruit or the like and are intended to replace the more expensive baskets of this kind heretofore in use. It preferably comprises a tray or body portion and a handle portion which may be readily applied to and detached from the tray so that the tray may be used either with or without the handle. The detachable handle or bails are preferably made of bendable and resilient metal or suitable material so that they can be adjusted or applied to different sized trays.

The objects of this invention are to provide a receptacle of the character indicated which may be easily manufactured at a low cost and which will be pleasing and attractive in appearance; to provide a receptacle comprising a tray or main body portion and a detachable handle or bail; to provide a bail or handle which may be readily attached to trays or the like, preferably of different shapes and sizes; and to provide such other improvements and advantages as will appear more fully from the following description.

In the accompanying drawing illustrating this invention,

Fig. 1 is a front view of the bail or handle;

Fig. 2 is a side view of the same;

Fig. 3 is a front view of a complete receptacle showing a slightly modified form of handle;

Fig. 4 is a side view of the receptacle shown in Fig. 3;

Fig. 5 is a plan view;

Fig. 6 is an enlarged detail taken on the line 6—6 of Fig. 5; and

Fig. 7 is a plan view showing a different form of tray such as bread tray with my improved handle attached thereto.

As shown in this drawing, 10 represents one form of the bail or handle and comprises a hoop portion 11 which is preferably formed of two wires 12. These wires are bent to substantially arch shape with their upper reaches secured together at 13 as by spot-welding or the like. The lower portion of the hoops are spread apart so that the handle is of substantially A-shape when viewed from the side. The lower ends of the bows are connected on opposite sides by means of transverse or circumferential bars 14 and 15, which are also spot-welded or otherwise secured to the bows. They are spaced a short distance apart for engagement with the rim or edge of a tray or the like.

In the slightly modified form shown in Figs. 3 and 4, the handle 16 is also made of two hoops as shown, but in this instance, the hoops and lower transverse members 17 are all formed of a single piece. Transverse rods or bars 18 are positioned above the lower transverse members 17 and may be secured to the bows in any desired manner.

The entire handle or bail is preferably made of relatively heavy wire which is sufficiently resilient or springy so that the end members may be sprung apart to bring them into engagement with the tray or dish, as for instance with the flange or rim 19 of a tray 20 as shown in Figs. 3 and 4. The sides of the bows may be bent to bring the end portions toward or away from each other, to adjust the handle to different sized trays as indicated by dotted lines in Fig. 1.

While the handle members may be made in any desired sizes, the ones which I have made for commercial purposes will readily clamp or fit on trays of approximately 12 inches in diameter and also somewhat smaller or larger sizes whereby one handle may be used for several different sized trays. The upper portion of the bail or handle being formed of two adjacent wires or rods provides a desirable hand hold for lifting the receptacle.

It will also be noted that while the lower transverse member 15 preferably clamps on the side of the tray and has a bearing underneath the edge of the tray, the upper transverse members such as 14 or 18 tend to prevent the handle from moving downwardly and provides a firm grip or bearing between the handle and the dish.

My improved receptacle and support is adapted to various modifications, one of which is illustrated in Fig. 7 in which the tray 21 is of the oblong or more-or-less conventional type commonly known as a "bread tray." The bail or handle 22 is of approximately the form above described, but with the ends shaped to conform to the ends of the tray as shown.

On account of the handles being detachable, the combined receptacles and handles may be more readily packed and shipped and will occupy comparatively small space. In addition to serving as baskets for selling fruit, these receptacles may be used for serving refreshments or for any other purpose desired.

Having thus described my invention, what I claim and desire to secure by Letters Patent is:

A tray having a peripheral bead portion and a detachable handle comprising two substantially arch-shaped flexible wires with their upper midportions rigidly fastened together to form a hand hold and their lower ends spread outwardly to provide triangular end sections, the lower corresponding end portions of the wires on each side being connected and braced by substantially parallel, outwardly curved and vertically spaced segmental bars, the lower bars being adapted to extend inwardly under the bead of the tray and to be firmly pressed against the tray by the tension of the handle wires and the upper bars being adapted to engage closely with the top of the bead of the tray whereby the tray will be securely held against lateral movement with respect to the handle and the handle will be firmly held in engagement with the tray.

MORRIS COOPER.